United States Patent
Gaudet

[11] 3,900,700
[45] Aug. 19, 1975

[54] PROTECTIVE ENCLOSURE

[75] Inventor: Fernand W. Gaudet, Mount Royal, Canada

[73] Assignee: Canadian Marconi Company, Montreal, Canada

[22] Filed: Feb. 4, 1974

[21] Appl. No.: 439,361

[52] U.S. Cl. .......... 174/16 R; 174/17 VA; 165/128
[51] Int. Cl. ............................................ H05k 7/20
[58] Field of Search .......... 174/15 R, 16 R, 17 VA; 317/100; 165/128

[56] References Cited
UNITED STATES PATENTS

| | | | |
|---|---|---|---|
| 1,823,535 | 9/1931 | Frutkow et al. | 174/16 R |
| 2,654,583 | 10/1953 | Treanor | 174/16 R X |
| 3,407,869 | 10/1968 | Stauntor | 165/128 X |
| 3,462,553 | 8/1969 | Spranger | 317/100 X |

Primary Examiner—J. V. Truhe
Assistant Examiner—David A. Tone
Attorney, Agent, or Firm—Alan Swabey; Robert E. Mitchell

[57] ABSTRACT

In enclosures designed to protect electronic or other equipments from the elements when these equipments are required to operate outdoors, considerable difficulty is experienced in dissipating heat generated internally or received from direct sun rays. This invention is a protective enclosure which is constructed in such a manner that it protects the enclosed equipment from rain or splash water and dissipates internally generated heat and heat from direct sun rays.

1 Claim, 1 Drawing Figure

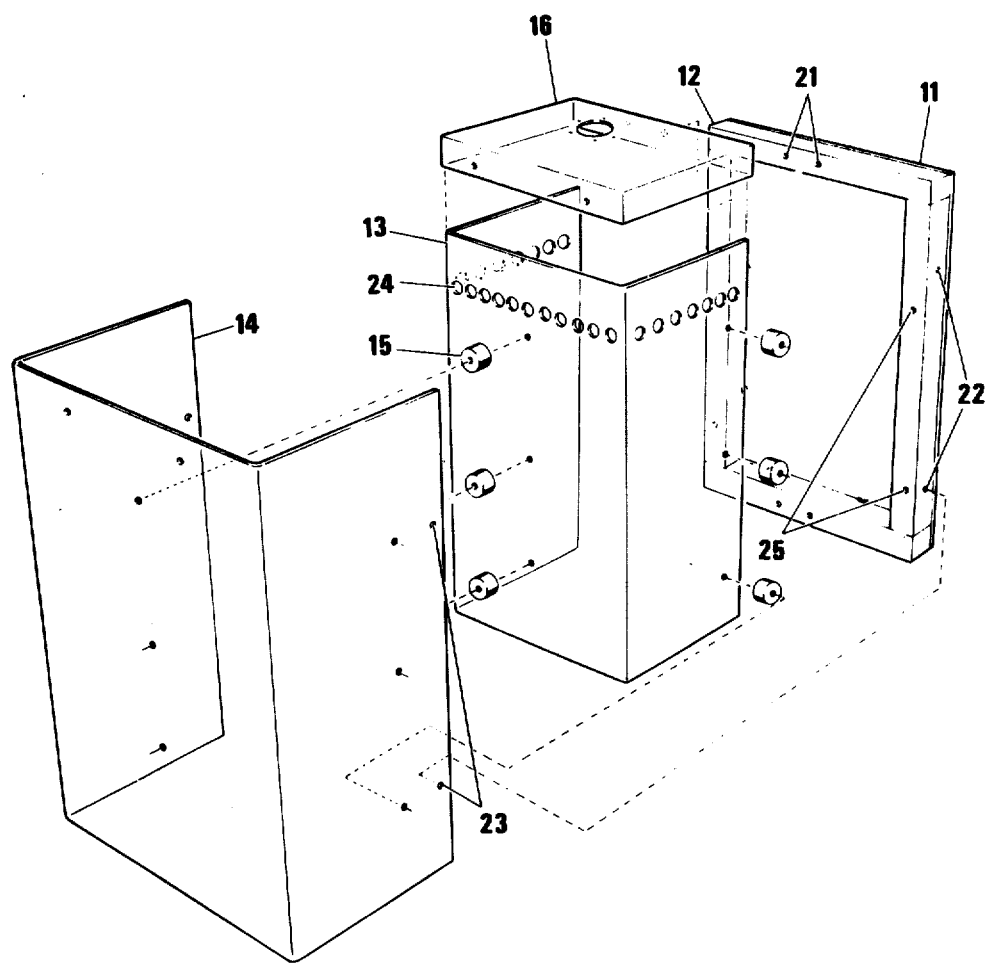

PROTECTIVE ENCLOSURE

BACKGROUND OF THE INVENTION

1. Field of the Invention

This invention relates to a protective enclosure for electronic or other equipment which is required to be exposed to weather aboard ship or on land. More specifically this invention relates to a protective enclosure which performs three functions: it protects the enclosed equipment from rain or splashed water, it prevents an increase in equipment temperature as a result of exposure to direct rays of the sun, and it enhances ventilation and dissipation of internally generated heat.

2. Description of the Prior Art

In most existing protective enclosures the equipment is protected against various forms of precipitation but no allowance or provision is made for the dissipation of internally generated heat. Internal heat caused by exposure to direct rays of the sun is extremely troublesome particularly in tropical latitudes and where the protective enclosures are constructed of single-wall metal. In some protective enclosures known to this applicant specially designed fan and blower motor systems are included to dissipate heat, but these require additional space, cost, and power consumption.

3. Summary of the Invention

The above-noted disadvantages are overcome in this invention by the use of double walls and without resorting to the addition of moving parts. The method of construction makes use of some well known physical properties of air and water to allow the protective enclosure to perform its functions passively at very little extra cost. The construction of the enclosure also provides for maintenance and servicing of the protected equipment with a minimum of difficulty.

This protective enclosure comprises a rigid back plate provided with means for mounting the back plate, and for mounting the protected equipment on the back plate and for mounting shields to the back plate; inner and outer metal shields held together as one unit by rivetting and held apart to allow for air circulation by spacers; a metal cover complete with vertical lip to fit over the inner shield and welded to the back plate; ventilation holes cut in the inner shield below the top cover lip with the top cover in place.

BRIEF DESCRIPTION OF THE DRAWINGS

The concept and structure of the enclosure can best be described with reference to the accompanying drawing which is an exploded view of the enclosure.

DETAILED DESCRIPTION OF THE DRAWINGS

The back plate 11 is mounted by the use of mounting holes 21. The back plate consists of a single sheet of heavy gauge metal to which is welded an outline frame 12 of 1 inch square metal tubing containing shield mounting holes 22. The equipment to be protected (not shown) is mounted on the back plate frame by the use of equipment mounting holes 25.

Inner shield 13 and outer shield 14 are rivetted together having a space maintained between them by spacers 15. Shields 13 and 14 as one unit are attached to the back plate frame 12 by the use of mounting holes 23 and mounting holes 22. Top cover 16 is built to fit only over inner shield 13 and is welded to back plate 11.

After installation, maintenance and servicing of the protected equipment is performed by merely disengaging four bolts at mounting holes 23 and removing the shield unit.

For ventilation of the protected equipment, holes 24 are cut in the inner shield just below the top cover lip, and the bottom of both shields is left open. When the internal air is warmed by heat from the protected equipment it rises and escapes through ventilation holes 24, drawing fresh cool air through the open bottom of the shield, thus giving continuous ventilation.

When outer shield 14 is heated by direct sun rays the air between the shields rises and escapes through the open top, drawing cool air through the open bottom, thus keeping the inner shield and the protected equipment cool. Additionally, the chimney effect of the air rising in the space between the shields assists the ventilation of the protected equipment.

The equipment is protected against rainwater or splash water by the inner shield and its top cover except for the ventilation holes. The holes are cut sufficiently far down from the top of the inner shield that rain or splash water cannot enter the holes directly because of the angle between the holes and the top of the outer shield. The only water that could enter the ventilation holes is that which runs down the sides of the inner shield from its top to the holes. It has been repeatedly demonstrated that surface tension or some other property causes the water to go around the ventilation holes, keeping the protected equipment dry.

I claim:

1. A protective enclosure for electronic or other equipment comprising a rigid back plate provided with means for mounting the back plate and for mounting the protected equipment on the back plate and for mounting shields to the back plate; inner and outer metal shields held together as one unit by rivetting and held apart to allow for air circulation by spacers; a metal cover complete with vertical lip which fits over the inner shield and is welded to the back plate; ventilation holes cut in the inner shield below the top cover lip with the top cover in place.

* * * * *